(12) United States Patent
Bartlett et al.

(10) Patent No.: US 10,060,774 B1
(45) Date of Patent: Aug. 28, 2018

(54) IMPELLER TYPE FLOW METER (71) Applicant: CREATIVE SENSOR TECHNOLOGY, INC., Rochester, MA (US)

(72) Inventors: Norman F. Bartlett, Rochester, MA (US); Charles Woringer, North Falmouth, MA (US); Thomas Duce, Bourne, MA (US)

(73) Assignee: CREATIVE SENSOR TECHNOLOGY, INC., Rochester, MA (US)

( * ) Notice: Subject to any disclaimer, the term of this patent is extended or adjusted under 35 U.S.C. 154(b) by 0 days.

(21) Appl. No.: 15/818,940

(22) Filed: Nov. 21, 2017

Related U.S. Application Data

(60) Provisional application No. 62/582,099, filed on Nov. 6, 2017.

(51) Int. Cl.
*G01F 1/06* (2006.01)

(52) U.S. Cl.
CPC ..................... *G01F 1/06* (2013.01)

(58) Field of Classification Search
CPC ............... G01F 1/06; G01F 1/05; G01F 1/32
See application file for complete search history.

(56) References Cited

U.S. PATENT DOCUMENTS

| | | | | |
|---|---|---|---|---|
| 4,136,565 A * | 1/1979 | Migrin | ...................... | G01F 1/44 73/861.62 |
| 4,164,144 A * | 8/1979 | Kaiser | ...................... | G01F 1/34 73/861.64 |
| 4,172,381 A * | 10/1979 | Aigner | .................... | G01F 1/065 73/861.77 |
| 4,292,853 A * | 10/1981 | Williams | .................. | G01F 1/06 73/861.79 |
| 4,389,897 A | 6/1983 | Kolodziejski et al. | | |
| 4,433,583 A | 2/1984 | Kirk | | |
| 4,656,873 A | 4/1987 | Stewart | | |
| 5,540,107 A | 7/1996 | Silverman et al. | | |
| 5,939,645 A | 8/1999 | Kellerman | | |
| 6,450,023 B1 * | 9/2002 | Addie | ...................... | G01L 3/26 73/168 |
| 7,603,915 B2 | 10/2009 | Spivak et al. | | |
| 7,913,577 B2 | 3/2011 | Tanaka et al. | | |
| 2014/0165719 A1 * | 6/2014 | Williamson | .............. | G01F 1/06 73/272 R |

* cited by examiner

*Primary Examiner* — Jewel V Dowtin
(74) *Attorney, Agent, or Firm* — McCarter & English, LLP; Kia L. Freeman; Thomas F. Foley (57) ABSTRACT

An in-line, impeller type flowmeter having an inlet flow taper section to converge flow to a measurement chamber and an outlet flow taper section after the measurement chamber, and further exhibiting a high turn-down ratio above about 30:1, and being suitable for use with a pipe having a nominal inner diameter no greater than one inch.

25 Claims, 4 Drawing Sheets

IMPELLER TYPE FLOW METER

RELATED APPLICATION

This application claims priority to U.S. Provisional Application No. 62/582,099, filed Nov. 6, 2017, and entitled "Impeller Type Flow Meter", the entire contents of which are incorporated herein by reference.

BACKGROUND

A variety of in-line flowmeters are used to measure fluid flow through a pipe. In one type of flowmeter, an impeller is placed partially or entirely within the flowstream such that the force of fluid moving through the pipe turns the impeller. The rate at which the impeller turns may be measured and used to determine the fluid flow rate through the pipe. Examples of flowmeters known in the art may be found in for example, U.S. Pat. Nos. 4,433,583; 4,656,873; 5,540,107; 5,939,645; 7,603,915; and 7,913,577.

The usefulness of a given flowmeter may be judged, in one aspect, by the flowmeter turn-down ratio. Turn-down ratio is the ratio of the lowest rate of flow measurable by the flowmeter to the highest rate of flow measurable by the flowmeter. Desirably, a flowmeter will have a large turn-down ratio such that it may handle a wide range of flow rates. Known impeller-type flowmeters exhibit a turn-down ratio of about 5:1, about 12:1 or up to about 15:1. Additionally, the detection limit, i.e., the lowest rate of flow measurable by the flowmeter, may be of interest for applications in which the flowmeter is to be used to measure low flow, such as in leak detection applications.

The present disclosure relates to an impeller type flowmeter featuring a substantially improved turn-down ratio, compared to known impeller type flowmeters, and suitable for use with a pipe having a nominal inner diameter up to one inch.

SUMMARY

The current disclosure provides for an impeller-type inline flowmeter featuring a turn-down ratio of at least about 30:1, preferably at least about 50:1, more preferably at least about 70:1, and most preferably at least about 80:1. Embodiments of an impeller-type inline flowmeter in accordance with the invention may be capable of measuring a flow rate as low as about 0.1 ft/sec. Embodiments of an impeller-type flowmeter in accordance with the invention may feature an inlet flow taper section to provide a smooth flow to and an outlet flow taper section to provide a smooth flow from a measurement chamber. The inlet flow taper section of embodiments of an impeller-type flowmeter in accordance with the invention may increase the flow rate from a pipe before the flowstream impinges on the impeller.

Embodiments of the present invention comprise a flowmeter for measuring flow of liquid out of a pipe. The flowmeter in accordance with the invention comprises a body and an impeller positioned within the body. The body comprises an inlet flow taper section, a measurement chamber connected to the inlet flow taper section, and an outlet flow taper section connected to the measurement chamber. The impeller is positioned at least partially within the measurement chamber and having a plurality of impeller blades. The cross-sectional flow area within the inlet flow taper section continuously decreases between the inlet of the inlet flow taper section and the outlet of the inlet flow taper section. The cross-sectional flow area within the outlet flow taper section continuously increases between the inlet of the outlet flow taper section and the outlet of the outlet flow taper section. The overall decrease in the cross-sectional flow area within the inlet flow taper section is more gradual than the overall increase in the cross-sectional flow area within the outlet flow taper section.

In some embodiments of the invention, a portion of an edge of an interior cross-sectional area of the measurement chamber is shaped to substantially conform to an end of one of the plurality of impeller blades. Unlike the pipe leading up to the flowmeter, a cross-section of the flow path through the measurement chamber is not substantially circular. In embodiments of the invention, an end of each of the plurality of impeller blades is not substantially shaped like an arc.

The flowmeter is capable of measuring liquid flow between a minimum liquid flow rate and a maximum liquid flow rate. In embodiments of the inventions, the maximum liquid flow rate measurable by the flowmeter is at least 30 times greater than the minimum liquid flow rate. In some embodiments, the maximum liquid flow rate measurable by the flowmeter is at least 50 times greater than the minimum liquid flow rate. In some embodiments, the maximum liquid flow rate measurable by the flowmeter is at least 80 times greater than the minimum liquid flow rate.

In some embodiments of the flowmeter, the body includes an inlet pipe socket connected to the inlet flow taper section and sized to connect to a pipe having a maximum nominal inner diameter of 1 inch. In some embodiments of the flowmeter, the body includes an outlet pipe socket connected to the outlet flow taper section and sized to connect to a pipe having a maximum nominal inner diameter of 1 inch.

In some embodiments of the invention, the cross-sectional flow area of the inlet flow taper section changes between the inlet of the inlet flow taper section and the outlet of the inlet flow taper section to match the cross-sectional flow area of the pipe at the inlet of the inlet flow taper section and to match the cross-sectional flow area of the measurement chamber at the outlet of the inlet flow taper section.

In some embodiments of the invention, the cross-sectional flow area of the outlet flow taper section changes between the inlet of the outlet flow taper section and the outlet of the outlet flow taper section to match the cross-sectional flow area of the measurement chamber at the inlet of the outlet flow taper section and to match the cross-sectional flow area of the pipe at the outlet of the outlet flow taper section.

In some embodiments of the invention, the inlet flow taper section may further comprise an inlet tapered cone and an inlet flow passage. The inlet tapered cone may feature a circular cross-sectional flow area throughout. The cross-sectional flow area of the inlet flow passage may change between the inlet of the inlet flow passage and the outlet of the inlet flow passage to match the cross-sectional flow area of the outlet of the inlet tapered cone at the inlet of the inlet flow passage and to match the cross-sectional flow area of the measurement chamber at the outlet of the inlet flow passage.

In some embodiments of the invention, the outlet flow taper section may comprise an outlet tapered cone and an outlet flow passage. The outlet tapered cone may feature a circular cross-sectional flow area throughout. The cross-sectional flow area of the outlet flow passage may change between the inlet of the outlet flow passage and the outlet of the outlet flow passage to match the cross-sectional flow area of the measurement chamber at the inlet of the outlet flow passage and to match the cross-sectional flow area of inlet of the inlet tapered cone at the outlet of the outlet flow passage.

In an embodiment, the present disclosure also provides for a flowmeter for measuring flow of liquid in a pipe, the flowmeter including an inlet pipe connection socket configured to receive the pipe; an inlet flow taper section configured to converge a flowstream received from the pipe to a reduced cross-sectional flow area at a measurement chamber, the measurement chamber having a substantially flat floor portion and a substantially circular top portion; an impeller at least partially within the measurement chamber; and an outlet flow taper section configured to diverge the flowstream received from the measurement chamber to an outlet pipe connection socket.

Embodiments of the flowmeter may incorporate one or more of the following features. The inlet flow passage may have a floor angled such that the inlet flow passage narrows from the inlet of the inlet flow passage to the measurement chamber and have a top section shape substantially unchanged along its length. The impeller may additionally include an impeller hub and a plurality of impeller roots, with each impeller root connected to the hub at one end and to one of the plurality of impeller blades at the opposite end, and the impeller positioned within the flowmeter such that each impeller root meet the impeller hub substantially at a top of the measurement chamber. The device may include an impeller chamber surrounding a portion of the impeller opposite the measurement chamber, the impeller chamber may have an interior cross-sectional area shaped to substantially conform to an end of each of the plurality of impeller blades. Each of the plurality of impeller blades may have a substantially flat end opposite the impeller root. The inlet flow passage may be longer than the outlet flow passage, such as between about 1.5 and 3 times longer.

A flowmeter in accordance with the invention may be sized for use with a pipe having a nominal inner diameter of ½ inch, of ⅝ inch, or of ¾ inch. A flowmeter in accordance with the invention may be sized for use with a pipe having a nominal inner diameter of no more than 1 inch. Nominal inner diameter of a pipe refers to the pipe size by which a pipe is denominated, and is intended to includes pipe having larger or smaller actual size. Moreover, maximum nominal pipe size is used to indicate that the device may be sized for use with that nominal pipe size or a smaller nominal pipe size. For example, maximum nominal inner diameter of 1 inch would include, for example, 1 inch pipe, ¾ inch pipe, ⅝ inch pipe, or ½ inch pipe.

The inlet flow passage of flowmeters in accordance with the invention may be between about 1.5 and 5 times longer than the outlet flow passage. The cross-sectional flow area may be reduced by about 20%, about 25%, about 30%, or preferably about 24% along the inlet tapered cone. The cross-sectional flow area may be reduced by about 10%, about 20%, about 25%, or preferably about 17% along the inlet flow passage. The interior cross-sectional flow area of the measurement chamber may be about 30%, about 35%, about 40%, about 45%, or preferably about 37% of the first cross-sectional area. The inlet flow taper section, the measurement chamber, and the outlet flow taper section may cumulatively have a length that is about 5, about 10, or preferably about 6 times the nominal inner diameter of the pipe the flow out of which the flowmeter is designed to measure. The inlet flow taper section of embodiments of the present invention may cumulatively have a length that is about 3, about 4, or preferably about 3.3 times the pipe diameter.

A goal of the present flowmeter is to provide a substantially laminar flow at the impeller in the measurement chamber when installed anywhere in a plumbing system. Commonly, existing flowmeters will specify that they must be installed downstream of a specified length of straight pipe so that the flowstream delivered to the impeller is substantially laminar. Such installation instructions for the prior art serves to avoid delivery of a turbulent flow to the flowmeter impeller, which reduced the accuracy of the flow measurement. By contrast, the present flowmeter may be configured to provide a substantially laminar flow at the impeller without a specified length of straight pipe leading up to the flowmeter. Thus, a flowmeter in accordance with the invention may accurately measure flow wherever it is installed in a plumbing system. As a result, the present flowmeter may be installed directly after an elbow, a T, or another plumbing feature that may cause turbulent flow. This feature simplifies installation instructions and avoids problems that may arise from failure to comply with installation instructions.

Flowmeters as described herein may be capable of measuring low flow rates as compared to know prior art. Flowmeters as described herein may be capable of measuring flow at a maximum flow rate as high as about 10 feet per second, or higher. Preferably flowmeters as described herein may be capable of measuring flow at a maximum flow rate as high as about 12 to about 20 feet per second. Flowmeters as described herein may be capable of measuring flow at a minimum flow rate as low as about 1.4 feet per second, or lower. Preferably flowmeters as described herein may be capable of measuring flow at a minimum flow rate as low as about 1.2 to about 0.05 feet per second. Unlike known prior art flow meters in the prior art, flowmeters as described herein may be capable of measuring leaks in otherwise unused residential plumbing. For example, flowmeters as described herein may be capable of measuring a leaking toilet in an unoccupied house.

Indeed, it is a further advantage of certain embodiments of the present disclosure that low friction may be achieved especially through balancing flow, achieving laminar flow, and placing the impeller such that losses are reduced. Reduced friction losses may be particularly desirable in low velocity applications as are of interest herein. In applications having low flow, energy lost to friction, turbulence, eddies, etc. will be more significant as the energy losses will account for a larger portion of the total. Reducing losses enhances accuracy of measurements at low flow rates.

DETAILED DESCRIPTION

Certain exemplary embodiments will now be described to provide an overall understanding of the principles of the structure, function, manufacture, and use of the devices disclosed herein. One or more examples of these embodiments are illustrated in the accompanying drawings. Those skilled in the art will understand that the devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

A flowmeter in accordance with invention may utilize a number of structural features to increase its ability to measure a low minimum flow rate with a high turn down ratio by increasing the flow rate and exhibiting low friction. For example, the flowmeter may have a converging inlet flow taper section feeding the measurement chamber and a diverging outlet taper section downstream of the measurement chamber, A reduction in the cross-sectional flow area from the pipe connection socket to the measurement chamber may be achieved in a number of ways. For example, in an inlet taper portion, the area may be reduced by uniformly tapering the walls of the component while maintaining a circular cross-section. As described below in connection with FIG. 1, the inlet flow taper portion may have more than one section, such as an inlet tapered cone and an inlet flow passage. Likewise, the outlet flow taper portion may have more than one section, such as an outlet flow passage and an outlet tapered cone. The inlet tapered cone may alternatively be described as a frustum of a right circular cone having a first diameter approximately equal the diameter of the inlet pipe connection socket and a second diameter smaller than the first diameter. Further, the cross-sectional area may be reduced along the length of an inlet flow passage with an irregular shape, such that the inlet flow passage is substantially circular at the point at which the inlet tapered cone meets the inlet flow passage, then is reduced along the inlet flow passage toward the measurement chamber. In particular, the inlet flow passage may match the measurement chamber at the outlet of the inlet flow passage by having a portion of an edge of the interior cross-sectional area (e.g., floor 133 in FIG. 1) which is narrowed or filled along that side, such that the resulting cross-section of the inlet flow passage proximate the measurement chamber is flattened on one side.

Additionally, the outlet flow passage may have substantially similar features to the inlet flow passage but in an opposite orientation. For example, the outlet flow passage may have a cross-section that is partially flattened proximate to the measurement chamber and corresponding to the measurement chamber, then with an increasing cross-sectional area along the length of the outlet flow passage to the outlet of the outlet flow passage to form a substantially circular cross-section at the end of the outlet flow passage proximate the outlet tapered cone. The outlet flow passage may also be shorter and therefore be more steeply raked to achieve the same change in area over a shorter length.

It may be appreciated that the descriptions given herein are with respect to the interior volumes of the flowmeter. The exterior of the device may be essentially of any shape, for example, the exterior may have a similar shape to the interior plus a certain wall thickness or thicknesses, where wall thickness may be determined to be appropriate to the strength required for an intended use. Alternatively, the device may be a larger solid piece having the interior volume as described herein.

Portions of the flowmeter may be of a single construction, e.g., a single molded piece, especially the body as described herein. The flowmeter may be substantially made from PVC (polyvinyl chloride), ABS (acrylonitrile butadiene styrene), UPVC (unplasticized polyvinyl chloride), PB-1 (polybutylene), PP (polypropylene), PE (polyethylene), PVDF (polyvinylidene fluoride), brass, copper, and combinations thereof. The flowmeter may be manufactured by any method, for example, molded, cast, or printed. The impeller may be made of the same or different material. For example, the impeller may be made from PVC, ABS, UPVC, PB-1, PP, PE, PVDF, HDPE (high density polyethylene), UHM-WPE (ultra-high molecular eight polyethylene), and combinations thereof.

Figure 1:
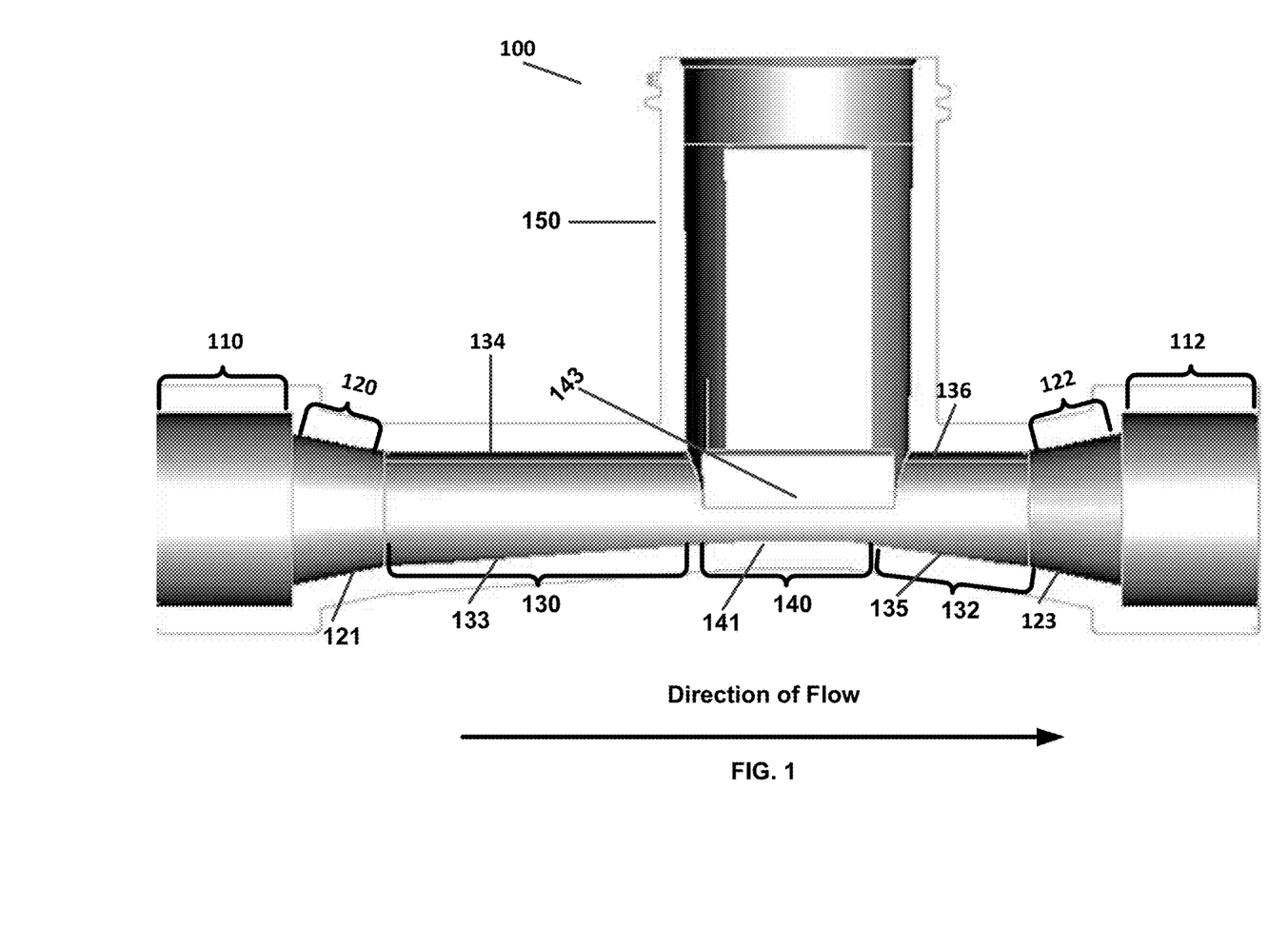
FIG. 1 shows a side view of a flowmeter housing as set forth herein.

FIG. 1 shows flowmeter body 100 according to an embodiment of the present disclosure. As depicted, flowmeter body 100 is oriented such that, in operation, the fluid flow is from left to right. Flowmeter housing 100 includes an inlet connection socket 110, an inlet tapered cone 120, an inlet flow passage 130, a measurement chamber 140, an outlet flow passage 132, an outlet tapered cone 122, and an outlet pipe connection socket 112. Flowmeter body 100 also includes sensor housing 150 positioned near measurement chamber 140. In flowmeter body 100, inlet tapered cone 120 and inlet flow passage 130 constituted the inlet flow taper section, and outlet flow passage 132 and outlet tapered cone 122 constituted the outlet for taper section. In an embodiment, each component of flowmeter body 100 may be molded as a single piece.

Inlet tapered cone 120 has tapered sides 121. Inlet taper segment 120 is a frustum of a right circular cone such that each cross-section of inlet tapered cone 120 will be circular, and, moving left to right, cross-sectional area will decrease. Similarly, outlet tapered cone 122 has tapered sides 123 and is a frustum of a right circular cone such that each cross-section of outlet taper segment 122 will be circular, and moving left to right, cross-sectional area will increase.

Inlet flow passage 130 of FIG. 1 features a changing cross-sectional area from left to right. Inlet flow passage 130 has a ramped floor 133 that rises and flattens moving from left to right, such that inlet flow passage 130 near measurement chamber 140 has a portion of an edge of an interior cross-sectional area at ramped floor 133 that is substantially flattened. That is, the flow path is bounded by a horizontal chord at the lower edge and the top portion 134 constituting the cross-sectional area. This shape substantially corresponds to the shape at measurement chamber 140, having flattened floor 141 and top section 143. In this way, inlet flow passage 130 provides a transition from the circular cross-section of inlet tapered cone 120 to the non-circular cross-sectional shape of measurement chamber 140. Thus, inlet flow passage (with inlet tapered cone 120) may serve to smoothly change the fluid flow into a different flow profile.

Figure 4:
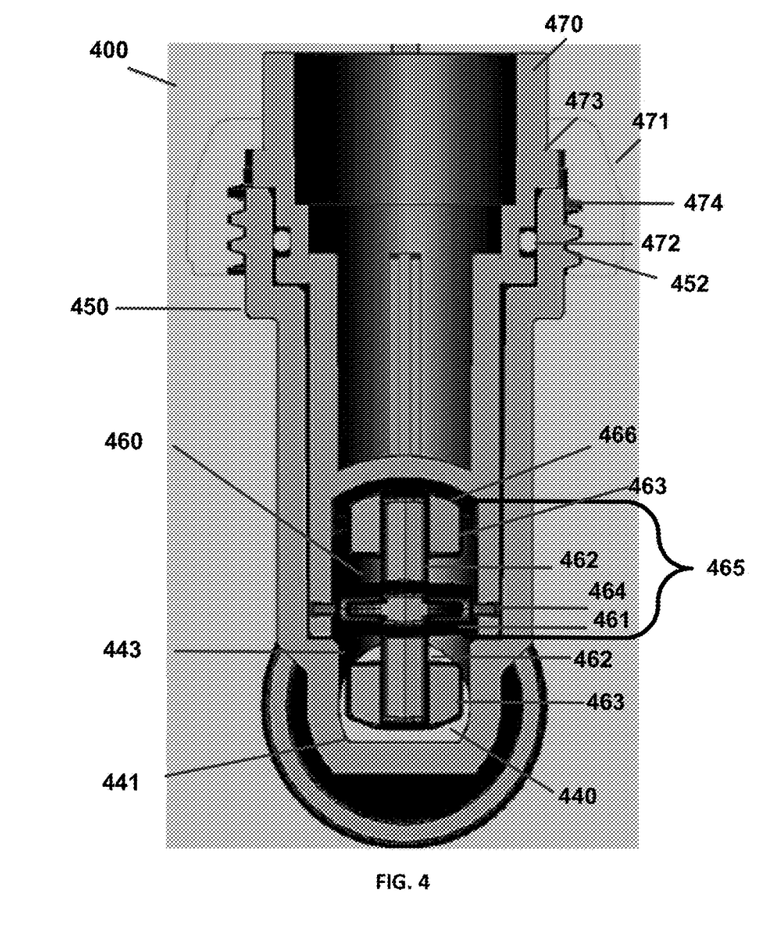
FIG. 4 shows an end view of a flowmeter as set forth herein.

Measurement chamber 140 of FIG. 1 features a portion of an edge of an interior cross-sectional area shaped to substantially conform to an impeller blade, which is formed by the flatted floor 141. This shape is also depicted in the cross-section view set forth in FIG. 4, which has a corresponding measurement chamber 440 with a flattened floor 441 and a top section 443 that is substantially round. Flowmeter body 100 as depicted does not feature an impeller. FIG. 4 shows impeller 460 within impeller insert 470 inserted into sensor housing 450, which corresponds to sensor housing 150 in FIG. 1, providing an exemplary assembly demonstrating how the flowmeter may be assembled from flowmeter body 100.

Flowmeter body 100 is designed be installed in-line by connecting pipe at inlet pipe connection socket 110 and outlet pipe connection socket 112, orienting the flowmeter such that the flowstream enters the device at inlet pipe connection socket 110 and exits at outlet pipe connection socket 112. Flowmeter body 100 could, alternatively, be installed horizontally, vertically, diagonally, or at another orientation.

As used herein, the cross-sectional area refers to the area of a cross-section of the flowmeter taken perpendicular to the flowpath through the flowmeter. For example, looking at flowmeter body 100 as depicted in FIG. 1, cross-sections would be taken vertically through the flowmeter, perpendicular to the plane of the page.

Figure 2:
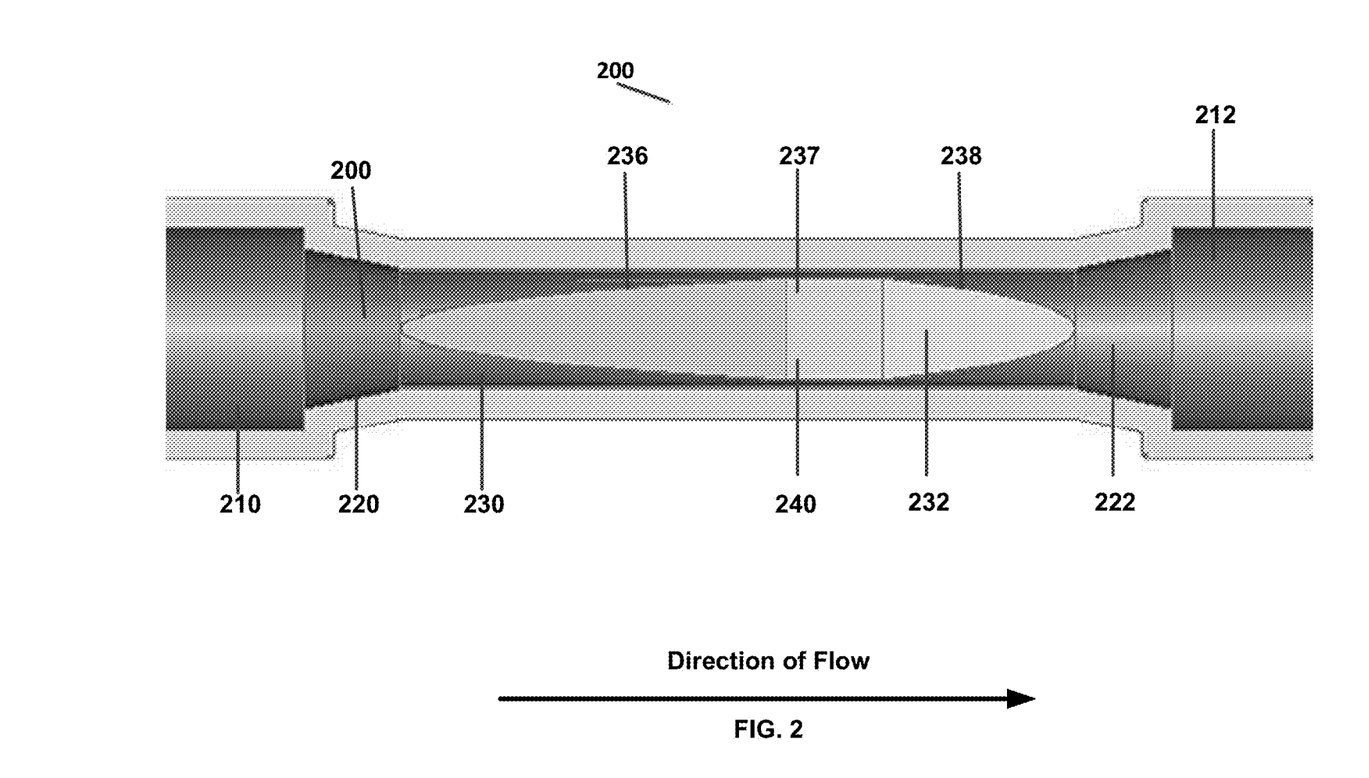
FIG. 2 shows a top view of a flowmeter housing as set forth herein.

FIG. 2 shows an overhead view of flowmeter body 200, which includes inlet pipe connection socket 210, inlet tapered cone 220, inlet flow passage 230, measurement chamber 240, outlet flow passage 232, outlet tapered cone 222, and outlet pipe connection socket 212. Inlet flow passage 230 is shaded to show varying heights of the floor moving left to right in the image and forming the flattened floor area at measurement chamber 240. Inlet flow passage 230 is drawn to show parabola 236 which shows that the elevated floor area begins at left in the center of the flowstream and, between the inlet of inlet flow passage 230 and the outlet of inlet flow passage 230, expands in width toward the sides of the flowstream such that it decreases the cross-sectional flow area. At the outlet of inlet flow passage 230 and in measurement chamber 240, the elevated floor area substantially occupies the full width. Then, between the inlet of outlet flow passage 232 and the outlet of outlet flow passage 232, the elevated floor gradually contracts in width, as shown by parabola 238, such that it increases the cross-sectional flow area. This shape further assists in achieving a laminar flow at the measurement chamber.

Figure 3:
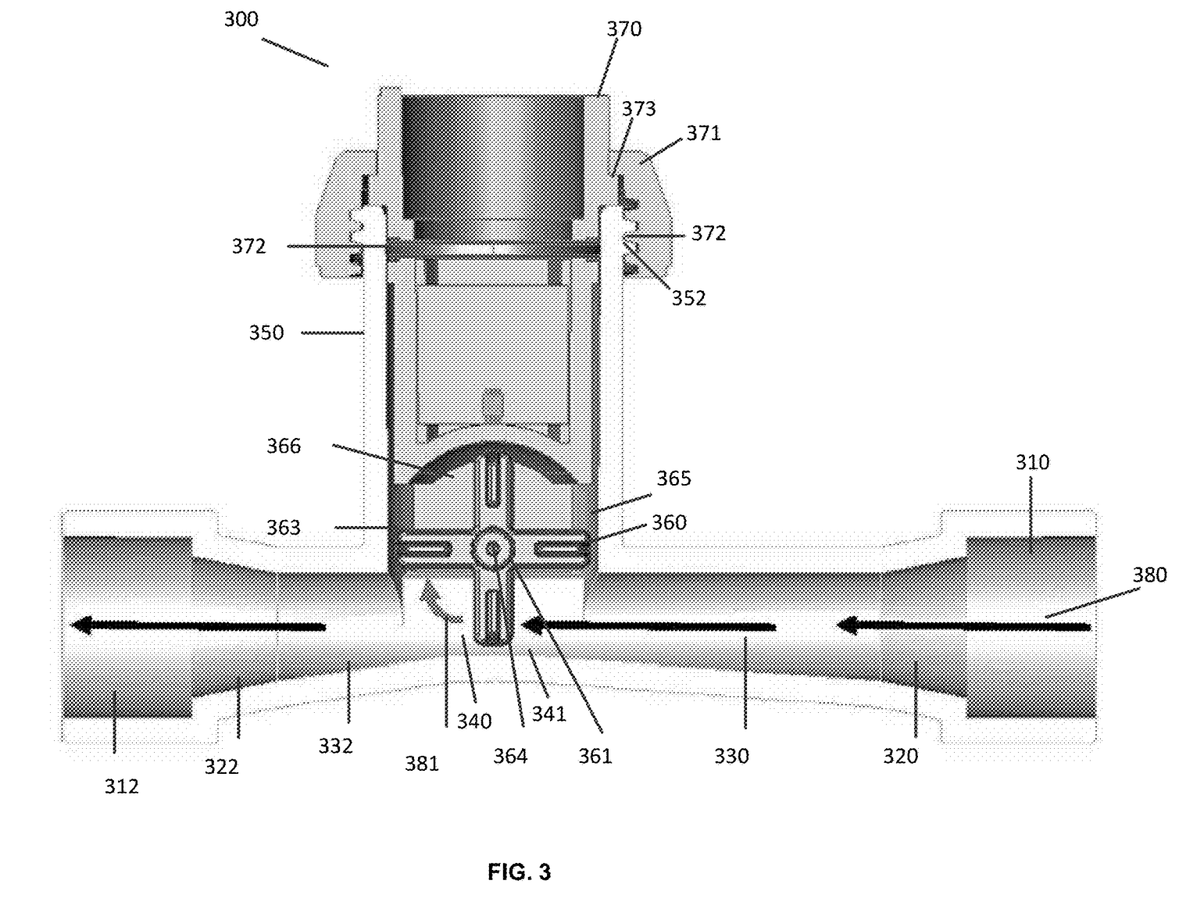
FIG. 3 shows a side view of a flowmeter as set forth herein.

An impeller may be added to the flowmeter body to form the flowmeter. This feature is illustrated in FIG. 3. FIG. 3 shows exemplary flowmeter 300 according to an embodiment of the present disclosure. Exemplary flowmeter 300 is oriented such that direction of flow is right to left. Flowmeter 300 includes both a flowmeter body (inlet pipe connection socket 310, inlet tapered cone 320, inlet flow passage 330, measurement chamber 340, sensor housing 350, outlet flow passage 332, outlet tapered cone 322 and outlet pipe socket 312) and impeller 360 situated within impeller chamber 365 of sensor insert 370. Flowmeter 300 shows arrows 380 depicted the flowstream traveling right to left as illustrated to turn impeller 360 clockwise as indicated by arrow 381. Measurement chamber 340 illustrates an embodiment having measurement chamber floor 341 which is sloped to further contribute to the inlet and outlet tapers.

Another view of the exemplary impeller is provided in FIG. 4. In FIG. 4, the impeller is rotates such that the blade is positioned entirely within the flowstream so that the liquid flow impinging one entire surface of the impeller blade. Impeller blade 463 as shown in FIG. 4 is sized to substantially fill a cross-section of measurement chamber 440. FIG. 4 depicts two impeller roots 462. Embodiments may be provided with four equally spaced impeller roots each at 90 degrees along the impeller hub, or more or fewer impeller roots may be used. Each impeller root is provided with an impeller blade 463. As shown, impeller blade 463 is chamfered to better balance flow around the edges of the blades within the flowstream and to correspond to the shape of the interior of measurement chamber 440, i.e., measurement chamber floor 441, and measurement chamber top 443. Additionally, the top portion 446 of impeller chamber 465 is configured to have a shape corresponding to blades 463 facilitating movement of blades 465 through top portion 446 while reducing friction losses and eddies associated with fluid flow in that region.

Further, when the impeller is positioned such that a given impeller blade has maximum exposure to the flowstream, i.e., is perpendicular to the flowstream, embodiments may provide that the flow volume around the impeller blade at the top of the measurement area may be substantially equivalent to the flow on the other side. That is, the gap between and around top portion 443 and the near edge of blade 463 may be comparable in size to the gap between floor 441 and the near edge of blade 440. Maintaining a similar gap size at each of these two regions of the flowstream may help to balance the liquid flow through the flowmeter and reduce the amount of friction associated with turbulent flow around the impeller blades.

As discussed above, it is a further advantage of certain embodiments of the present disclosure that low friction may be achieved especially through balancing flow, achieving laminar flow, and placing the impeller such that losses are reduced. Reduced friction losses may be particularly desirable in low flow rate applications as are of interest herein.

In embodiments, the inlet flow passage may be longer than the outlet flow passage. The inlet flow passage may be between about 1.5 and 5 times longer than the outlet flow passage. For example, in flowmeter body 100 of FIG. 1, inlet flow passage 130 is longer than outflow flow passage 132. This configuration may help to maximize the venturi effect and flow rate at the measurement chamber while ensuring sufficient upstream length to establish laminar flow, as well as reduce overall length.

The impeller may additionally include an impeller hub and a plurality of impeller roots, with each impeller root connected to the hub at one end and to one of the plurality of impeller blades at the opposite end. FIG. 4, which is a view taken at the impeller perpendicular to the flowpath, shows flowmeter 400 having an impeller 460 having an impeller hub 461 with shaft 464, impeller roots 462 connected to impeller hub 461 and impeller blades 463 attached to impeller roots 462. Further, impeller 460 is positioned within flowmeter 400 such that each impeller root 462 meets impeller hub 461 substantially at a top portion 443 of the measurement chamber 440. The impeller blades 463 are attached the impeller roots 462 just below this point, such that when fully rotated downward, each impeller blade 463 is fully within the measurement chamber 440. An impeller chamber surrounding a portion of the impeller opposite the measurement chamber, the impeller chamber having a spherical portion configured to correspond to the impeller blade. The hub may include a bearing that turns upon the shaft.

Flowmeter 400 also demonstrates one means of assembling an embodiment. As shown, sensor housing 450, which may be part of a unitary molded body, as described in connection with sensor housing 150 in FIG. 1, receives sensor insert 470. Sensor insert 470 may include an impeller chamber 465 that connects to impeller 460. Sensor insert 470 with impeller 460 may then be inserted into sensor housing 450. In flowmeter 400, sensor insert 470 is held within sensor housing 450 by collar 471 which applies pressure against rings 473 of housing insert 470 when collar 471 is tightened against sensor housing 450 through the action of threads 474 of collar 471 and threads 452 of sensor housing 450. Additionally, seal 472, which may be an O-ring, is provided between sensor insert 470 and sensor housing 450 to contain any fluid flow therethrough.

The flowmeter may be sized for use with a pipe having a nominal inner diameter of 1 inch or less, for example pipe diameters of ½ inch, ¾ inch, and 1 inch. The cross-sectional area may be reduced along the inlet tapered cone by about 20%, about 25%, about 30%, or preferably about 24%. The cross-sectional area may be reduced by about 1%, about 20%, about 25%, or preferably about 17% along the inlet flow passage. The interior cross-sectional area of the measurement chamber may be about 30%, about 35%, about 40%, about 45%, or preferably about 37% of the cross-sectional area of the pipe. The inlet taper segment, the inlet flow passage, the measurement chamber, the outlet flow passage, and the outlet tapered cone may cumulatively have a length that is about 5, about 10, or preferably about 6 times the pipe diameter. The inlet taper segment and the inlet flow passage may cumulatively have a length that is about 3, about 4, or preferably about 3.3 times the pipe diameter.

The flowmeter may have a minimum flow rate from about 0.05 to 1.4 feet per second, or preferably about 0.1 foot per second. The flowmeter may have a maximum flow rate from about 10 to about 15 feet per second or preferably about 12 feet per second.

Table 1 sets forth dimensions and a relationship used in an exemplary flowmeter constructed according to the present disclosure. This embodiment is for use with a ¾ inch pipe.

TABLE 1

Dimensions of a Flowmeter for ¾ inch PVC Pipe

| Name | Length (Inches) | Percentage of Length (Excluding Sockets) | Ratio of Entry to Exit Diameter. | Cross Sectional Area (Square Inches) | Percentage Change in Area | Ratio of Entry Area to Exit Area |
|---|---|---|---|---|---|---|
| Meter housing | 6.0 | NA | 1:1 | | | |
| Internal flow path | 4.5 | 100% | | | | |
| Inlet tapered cone | 0.5 | 11% | 1:0.76 | | | |
| Inlet flow passage | 2 | 44% | not circular | 0.307 to 0.255 | 20% decrease | 1.0:0.83 |
| Measurement chamber | 0.5 | 11% | not circular | 0.255 | none | |
| Outlet flow passage | 1 | 22% | not circular | 0.255 to 0.307 | 20% increase | 1.0:1.205 |
| Outlet tapered cone | 0.5 | 11% | 1:1.32 | | | |

As shown in Table 1, the outlet flow passage in the exemplary flowmeter is about half the length of the inlet flow passage, but has the same range of cross sectional area. Correspondingly, the outlet flow passage much exhibit a faster change in cross-sectional area along the length of the device in order to achieve the transition from size of the flowstream at the measurement chamber to time of measurement. However, the inlet tapered cone and the outlet tapered cone are both approximately the same length and have the same area ratios over their length. The exemplary flowmeter has been found to achieve a turn-down ratio in excess of 80:1 with a minimum flow rate of about 0.1 feet per second and a maximum flow rate of about 12 feet per second.

One of ordinary skill in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

The invention claimed is:

1. A flowmeter for measuring flow of liquid out of a pipe, the flowmeter comprising:
   a body comprising
      an inlet flow taper section;
      a measurement chamber connected to the inlet flow taper section; and
      an outlet flow taper section connected to the measurement chamber; and
   an impeller positioned at least partially within the measurement chamber and comprising a plurality of impeller blades;
   wherein the cross-sectional flow area within the inlet flow taper section continuously decreases between the inlet of the inlet flow taper section and the outlet of the inlet flow taper section;
   wherein the cross-sectional flow area within the outlet flow taper section continuously increases between the inlet of the outlet flow taper section and the outlet of the outlet flow taper section; and
   wherein the overall decrease in the cross-sectional flow area within the inlet flow taper section is more gradual than the overall increase in the cross-sectional flow area within the outlet flow taper section; and
   wherein the measurement chamber has a portion of an edge of an interior cross-sectional area shaped to substantially conform to an end of one of the plurality of impeller blades.

2. The flowmeter of claim 1, wherein the cross-sectional flow area of the inlet flow taper section changes between the inlet of the inlet flow taper section and the outlet of the inlet flow taper section to match the cross-sectional flow area of the measurement chamber at the outlet of the inlet flow taper section.

3. The flowmeter of claim 1, the body further comprising:
   an inlet pipe socket connected to the inlet flow taper section and sized to connect to a pipe having a maximum nominal inner diameter of 1 inch, and
   an outlet pipe socket connected to the outlet flow taper section and sized to connect to a pipe having a maximum nominal inner diameter of 1 inch.

4. The flowmeter of claim 1, wherein the inlet flow taper section comprises an inlet tapered cone and an inlet flow passage and wherein the outlet flow taper section comprises an outlet tapered cone and an outlet flow passage.

5. The flowmeter of claim 4, wherein the cross-sectional flow area of the inlet flow passage changes between the inlet of the inlet flow passage and the outlet of the inlet flow passage to match the cross-sectional flow area of the measurement chamber at the outlet of the inlet flow passage.

6. The flowmeter of claim 1,
the impeller further comprising an impeller hub and a plurality of impeller roots,
wherein each of the plurality of impeller roots connects to the impeller hub at a first end and to one of the plurality of impeller blades at a second end; and
wherein the impeller is positioned within the flowmeter such that each impeller root meets the impeller hub substantially at a top of the measurement chamber.

7. The flowmeter of claim 1, further comprising an impeller chamber surrounding a portion of the impeller opposite the measurement chamber, the impeller chamber having an interior cross-sectional area shaped to substantially conform to an end of each of the plurality of impeller blades.

8. The flowmeter of claim 6, wherein each of the plurality of impeller blades comprises a substantially flat end opposite the impeller root.

9. The flowmeter of claim 1, wherein the length of the inlet flow taper section is between about 1.5 and 3 times longer than the length of outlet flow taper section.

10. The flowmeter of claim 1, wherein the cross-sectional flow area at the outlet of the inlet flow taper section is at least 30% smaller than the cross-sectional flow area at the inlet of the inlet flow taper section.

11. The flowmeter of claim 4, wherein the cross-sectional flow area at the outlet of the inlet tapered cone is at least 20% smaller than the cross-sectional flow area at the inlet of the inlet tapered cone.

12. The flowmeter of claim 4, wherein the cross-sectional flow area at the outlet of the inlet flow passage is at least 15% smaller than the cross-sectional flow area at the inlet of the inlet flow passage.

13. The flowmeter of claim 1, wherein the combined length of the inlet flow taper section and the outlet flow taper section is about 15 times the diameter of a circle having the cross-sectional area approximately the same as the cross-sectional area of the measurement chamber.

14. The flowmeter of claim 3, wherein the inlet flow taper section has a length that is between about 3 and about 4 times the maximum nominal inner diameter of the pipe the flow out of which the flowmeter is designed to measure.

15. The flowmeter of claim 1, wherein the flowmeter is capable of measuring liquid flow between a minimum liquid flow rate and a maximum liquid flow rate and wherein the maximum liquid flow rate is at least 30 times greater than the minimum liquid flow rate.

16. The flowmeter of claim 1, wherein the flowmeter is capable of measuring liquid flow between a minimum liquid flow rate and a maximum liquid flow rate and wherein the maximum liquid flow rate is at least 50 times greater than the minimum liquid flow rate.

17. The flowmeter of claim 1, wherein the flowmeter is capable of measuring liquid flow between a minimum liquid flow rate and a maximum liquid flow rate and wherein the maximum liquid flow rate is at least 80 times greater than the minimum liquid flow rate.

18. The flowmeter of claim 1, wherein the flowmeter is capable of measuring liquid flow at a minimum flow rate of between about 0.10 and about 0.5 feet per second.

19. The flowmeter of claim 1, wherein the flowmeter is capable of measuring liquid flow at a maximum flow rate between about 10 and about 20 feet per second.

20. A flowmeter for measuring flow of liquid out of a pipe, the flowmeter comprising:
a body comprising
an inlet flow taper section;
a measurement chamber connected to the inlet flow taper section; and
an outlet flow taper section connected to the measurement chamber; and
an impeller positioned at least partially within the measurement chamber and having a plurality of impeller blades;
wherein the cross-section flow area within the inlet flow taper section continuously decreases between the inlet of the inlet flow taper section and the outlet of the inlet flow taper section;
wherein the cross-sectional flow area within the outlet flow taper section continuously increases between the inlet of the outlet flow taper section and the outlet of the outlet flow taper section; and
wherein the overall decrease in the cross-sectional flow area within the inlet flow taper section is more gradual than the overall increase in the cross-sectional flow area within the outlet flow taper section; and
wherein the flowmeter is capable of a turn-down ratio of at least 30:1.

21. The flowmeter of claim 20, the body further comprising:
an inlet pipe socket connected to the inlet flow taper section and sized to connect to a pipe having a maximum nominal inner diameter of 1 inch, and
an outlet pipe socket connected to the outlet flow taper section and sized to connect to a pipe having a maximum nominal inner diameter of 1 inch.

22. A flowmeter for measuring flow of liquid out of a pipe, the flowmeter comprising:
a body comprising
an inlet pipe socket sized to connect to a pipe having a maximum nominal inner diameter of 1 inch;
an inlet flow taper section connected to the inlet pipe socket;
a measurement chamber connected to the inlet flow taper section;
an outlet flow taper section connected to the measurement chamber; and
an outlet pipe socket connected to the outlet flow taper section and sized to connect to a pipe having a maximum nominal inner diameter of 1 inch; and
an impeller positioned at least partially within the measurement chamber and having a plurality of impeller blades; and
wherein the cross-sectional flow area within the inlet flow taper section continuously decreases between the inlet of the inlet flow taper section and the outlet of the inlet flow taper section;
wherein the cross-sectional flow area within the outlet flow taper section continuously increases between the inlet of the outlet flow taper section and the outlet of the outlet flow taper section; and
wherein the overall decrease in the cross-sectional flow area within the inlet flow taper section is more gradual than the overall increase in the cross-sectional flow area within the outlet flow taper section.

23. The flowmeter of claim 22, wherein the flowmeter is capable of measuring liquid flow between a minimum liquid flow rate and a maximum liquid flow rate and wherein the maximum liquid flow rate is at least 30 times greater than the minimum liquid flow rate.

24. The flowmeter of claim 22, wherein the inlet flow taper section comprises an inlet tapered cone and an inlet flow passage and the outlet flow taper section comprises an outlet tapered cone and an outlet flow passage.

25. The flowmeter of claim 24, wherein the cross-sectional flow area of the inlet flow passage changes between the inlet of the inlet flow passage and the outlet of the inlet flow passage to match the cross-sectional flow area of the measurement chamber at the outlet of the inlet flow passage.

* * * * *